United States Patent
Cho et al.

(10) Patent No.: US 9,413,942 B2
(45) Date of Patent: Aug. 9, 2016

(54) METHOD OF SETTING CAMERA PROFILE AND APPARATUS OF OBTAINING IMAGE

(71) Applicant: HANWHA TECHWIN CO., LTD., Changwon-Si (KR)

(72) Inventors: Sung Bong Cho, Changwon-si (KR); Hyong Kyun Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 99 days.

(21) Appl. No.: 14/317,612

(22) Filed: Jun. 27, 2014

(65) Prior Publication Data

US 2015/0207977 A1    Jul. 23, 2015

(30) Foreign Application Priority Data

Jan. 20, 2014  (KR) .................. 10-2014-0006733

(51) Int. Cl.
*H04N 5/232*   (2006.01)
*H04N 7/18*    (2006.01)

(52) U.S. Cl.
CPC ............. *H04N 5/23206* (2013.01); *H04N 7/18* (2013.01)

(58) Field of Classification Search
CPC .......... H04N 5/23203; H04N 5/23206; H04N 5/23225; H04N 5/23245
See application file for complete search history.

(56) References Cited

U.S. PATENT DOCUMENTS

| | | | | |
|---|---|---|---|---|
| 6,006,039 A * | 12/1999 | Steinberg | ............... | G03B 7/091 348/E5.043 |
| 6,163,816 A * | 12/2000 | Anderson | .......... | H04N 1/00204 348/E5.042 |
| 6,970,189 B1* | 11/2005 | Bernstein | ............... | H04N 5/232 348/207.99 |
| 8,671,435 B2 | 3/2014 | Bae | | |
| 2013/0128052 A1* | 5/2013 | Catrein | .................. | H04N 5/232 348/159 |
| 2014/0176736 A1* | 6/2014 | Sato | .................... | H04N 1/00344 348/207.11 |
| 2015/0054967 A1* | 2/2015 | Nagaike | ............. | H04N 1/00129 348/207.1 |
| 2015/0172531 A1* | 6/2015 | Ikeda | ................. | H04N 5/23206 348/207.11 |

FOREIGN PATENT DOCUMENTS

| | | |
|---|---|---|
| JP | 2007-081736 A | 3/2007 |
| KR | 10-2007-0108627 A | 11/2007 |
| KR | 10-2012-0033450 A | 4/2012 |

OTHER PUBLICATIONS

Wikipedia—Comprator, retrieved from https://en.wikipedia.org/wiki/Comparator on Dec. 10, 2015.*

* cited by examiner

*Primary Examiner* — Timothy J Henn
(74) *Attorney, Agent, or Firm* — Sughrue Mion, PLLC

(57) ABSTRACT

An apparatus for receiving an image is provided. The apparatus includes: a camera searcher configured to search for a camera connected to a network; a camera register configured to register information about the camera which is identified as a result of the searching by the camera searcher; a profile setter configured to set a profile of the camera by referring to the information obtained from the camera; and an image receiver configured to receive an image from the camera according to the profile.

18 Claims, 4 Drawing Sheets

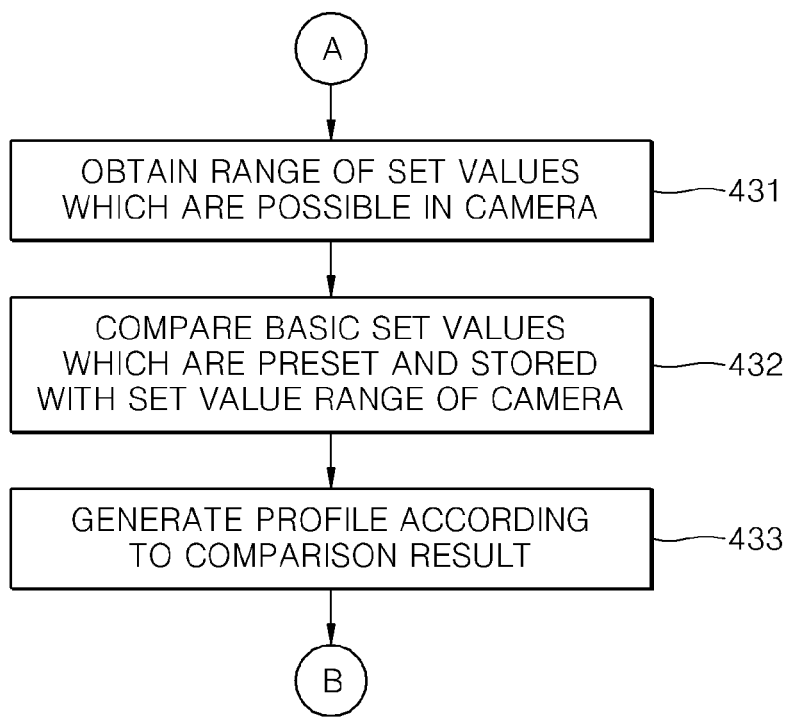

METHOD OF SETTING CAMERA PROFILE AND APPARATUS OF OBTAINING IMAGE

CROSS-REFERENCE TO RELATED APPLICATION

This application claims priority from Korean Patent Application No. 10-2014-0006733, filed on Jan. 20, 2014, in the Korean Intellectual Property Office, the disclosure of which is incorporated herein in its entirety by reference.

BACKGROUND

1. Field

Methods and apparatuses consistent with exemplary embodiment of the inventive concept relate to setting a camera profile and receiving an image according to the set profile.

2. Description of the Related Art

A surveillance system may include network cameras and a server, which are connected through a communication network. A surveillance system may store an image obtained from a camera, transmit the image to a client or display the image on a display device.

An image obtained in a surveillance system may be used in a variety of ways, and set values of an image required for each purpose may be different. For example, an image transmitted to a mobile terminal needs to be set to low values of capacity, resolution, and bit rate. In another example, the resolution of an image, which is transmitted to a display device, needs to be set according to the resolution of the display device.

When the setting of an image required in a surveillance system does not match the setting of an image of a camera connected to the surveillance system, a problem occurs in the process of using an image which is transmitted from the camera, in the surveillance system.

Korean Laid-Open Patent Publication No. 2012-0131649 discloses an intelligent surveillance system which converts specifications of image data, which is input from a network camera, into specifications required by a user, and provides the converted data.

SUMMARY

One or more exemplary embodiments of the inventive concept provide a method of setting a camera profile and an apparatus for receiving an image according to the profile. Technological objects of the present embodiments are not limited by this, and other technological objects may be derived from the following embodiments. Additional aspects will be set forth in part in the description which follows and, in part, will be apparent from the description, or may be learned by practice of the presented embodiments.

According to an aspect of one or more embodiments, there is provided a method of setting a camera profile which may include: searching for a camera connected to a network; registering, in a memory, information about the camera which is identified as a result of the searching; setting a profile of the camera by referring to the information about the camera; and receiving an image from the camera according to the profile.

The profile may include at least one set value, and the method may further include setting a basic set value, and the setting the profile of the camera may include: obtaining a range of set values which are possible in the camera; comparing the basic set value with the range of set values; and generating the profile according to a result of the comparison.

The generating the profile may include: if the basic set value is included in the range of set values of the camera, generating the profile to include the basic set value; if the basic set value is lower than a lowest set value of the camera, generating the profile to include the lowest set value; and if the basic set value is higher than a highest set value, generating the profile to include the highest set value.

The profile may include a plurality of set values, and the setting the basic set value may include setting the basic set values based on priority information about each of the set values.

The profile may include at least one of resolution, frame rate, codec, and bit rate with regard to the image transmitted from the camera.

The setting the basic set value may be performed based on at least one of performance of a network device for receiving am image, capacity of a storage device for storing the image received by the network device, and a display device for displaying the image received by the network device. The receiving may be performed using the network device.

According to an aspect of one or more embodiments, there is provided an apparatus for receiving an image which may include: a camera searcher configured to search for a camera connected to a network; a camera register configured to register information about the camera which is identified as a result of the searching by the camera searcher; a profile setter configured to set a profile of the camera by referring to the information obtained from the camera; and an image receiver configured to receive an image from the camera according to the profile.

The profile may include at least one set value, and the apparatus may further include a basic set value setter configured to set a basic set value, and the profile setter may include: a camera performance obtainer configured to obtain a range of set values which are possible in the camera; a comparator configured to compare the basic set value with the range of set values; and a profile generator configured to generate the profile according to a result of the comparison.

In the apparatus, if the basic set value is included in the range of set values of the camera, the profile generator may generate the profile to include the basic set value; if the basic set value is lower than a lowest set value of the camera, the profile generator may generate the profile to include the lowest set value; and if the basic set value is higher than a highest set value, the profile generator may generate the profile to include the highest set value.

The profile may include a plurality of set values, and the basic set value setter may set the basic set values based on priority information of each of the set values.

The profile may include at least one of resolution, frame rate, codec, and bit rate with respect to the image transmitted from the camera.

The basic set value setter may set the basic set value based on at least one of performance of a network device for receiving an image, capacity of a storage device for storing the image received by the network device, and a display device for displaying the image received by the network device. The image receiver may use the network device.

According to an aspect of one or more embodiments, there is provided a computer-readable recording medium which may have embodied thereon a computer program for executing the above method.

According to the method of setting a camera profile and the apparatus for receiving an image of the above embodiments, a profile of a camera is automatically generated according to the specifications of the camera and the setting of an apparatus for receiving an image, and thus convenience of users improves and user needs are satisfied.

BRIEF DESCRIPTION OF THE DRAWINGS

These and/or other aspects will become apparent and more readily appreciated from the following description of the exemplary embodiments, taken in conjunction with the accompanying drawings, in which:

FIG. 5 is a detailed flowchart of an operation of generating a profile of a camera of the method of FIG. 4, according to an exemplary embodiment.

DETAILED DESCRIPTION

Figure 1:
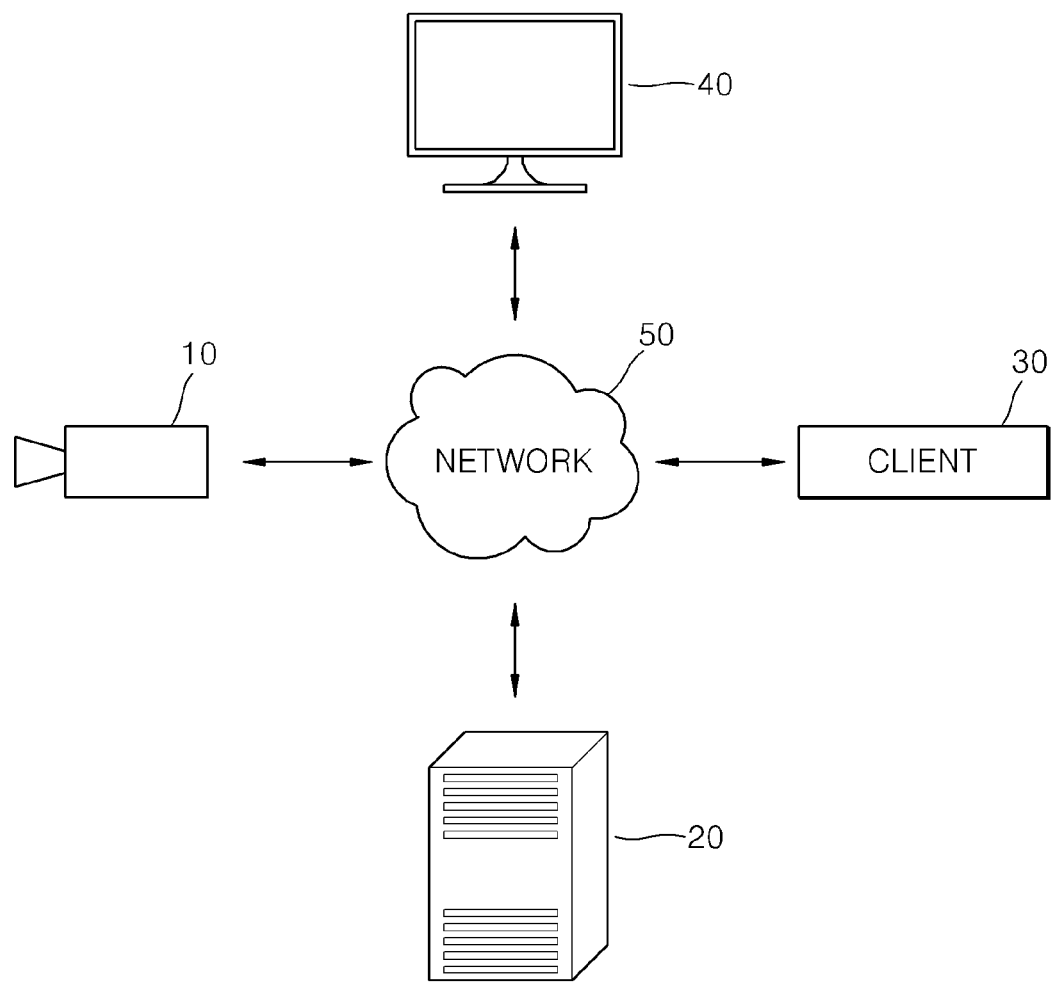
FIG. 1 is diagram illustrating a surveillance system according to an exemplary embodiment.

The inventive concept may be implemented with various changes and have many different embodiments, and will now be described more fully with reference to the accompanying drawings, in which exemplary embodiments of the inventive concept are shown. The effects and features, and methods to achieve those objects according to the inventive concept will be clearly understood by referring to the drawings and exemplary embodiments described below. The inventive concept may, however, should not be construed as being limited to the embodiments set forth herein; rather, these embodiments are provided so that this disclosure will be thorough and complete, and will fully convey the inventive concept to those skilled in the art.

Hereinafter, the exemplary embodiments will be described in detail by referring to attached drawings, and like reference numerals in the drawings denote like elements, and overlapping explanation will be omitted.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more of other features or elements. Expressions such as "at least one of," when preceding a list of elements, modify the entire list of elements and do not modify the individual elements of the list.

FIG. 1 is diagram illustrating a surveillance system according to an exemplary embodiment.

Referring to FIG. 1, the surveillance system according to an exemplary embodiment includes a camera 10 and a server 20. The camera 10 and the server 20 are connected to each other through a network 50, and exchange data such as image data through the network 50. The surveillance system may further include a client which communicates with the server 20 through the network 50, and a display device 40, which displays an image.

In the surveillance system shown in FIG. 1, only those elements related to the present embodiment are shown in order to prevent features of the present embodiment from becoming unclear. Accordingly, general-purpose elements, other than those elements shown in FIG. 1, may further be included, as understood by a person skilled in the art.

The camera 10 obtains an image of a surveillance area and transmits the image to the server 20 through the network 50. In detail, the camera 10 obtains image data on the surveillance area and transmits the image data to the server 20. The image data may include audio data.

The camera 10 may be a network camera including a network communication unit. Though only one camera 10 is shown in FIG. 1, a plurality of cameras may be provided in order to efficiently monitor the surveillance area.

The server 20 obtains image data from the camera 10, and transmits the image data to another device or stores the image data. For example, the server 20 stores the image data in a separate storage device, or transmits the image data to the client 30 and/or the display device 40.

The client 30 may receive image data from the server 20. For example, the client 30 may request transmission of an image and desired specifications of an image from the server 20 and receive the image from the server 20. Though only one client 30 is shown in FIG. 1, a plurality of clients may be connected to the server 20.

The display device 40 may receive image data and/or information related to control of the surveillance system from the server 20, and may display them. Though only one display device 40 is shown in FIG. 1, a plurality of display devices with identical specifications or different specifications may be provided.

The network 50 may be a wired or wireless network.

Referring to FIG. 1, it is shown that the camera 10, the server 20, the client 30, and the display device 40 are connected to the same network 50. However, the present embodiment is not limited to this, and, for example, the camera 10, the server 20, the client 30, and the display device 40 may be connected to each other through separate and different networks.

Figure 2:
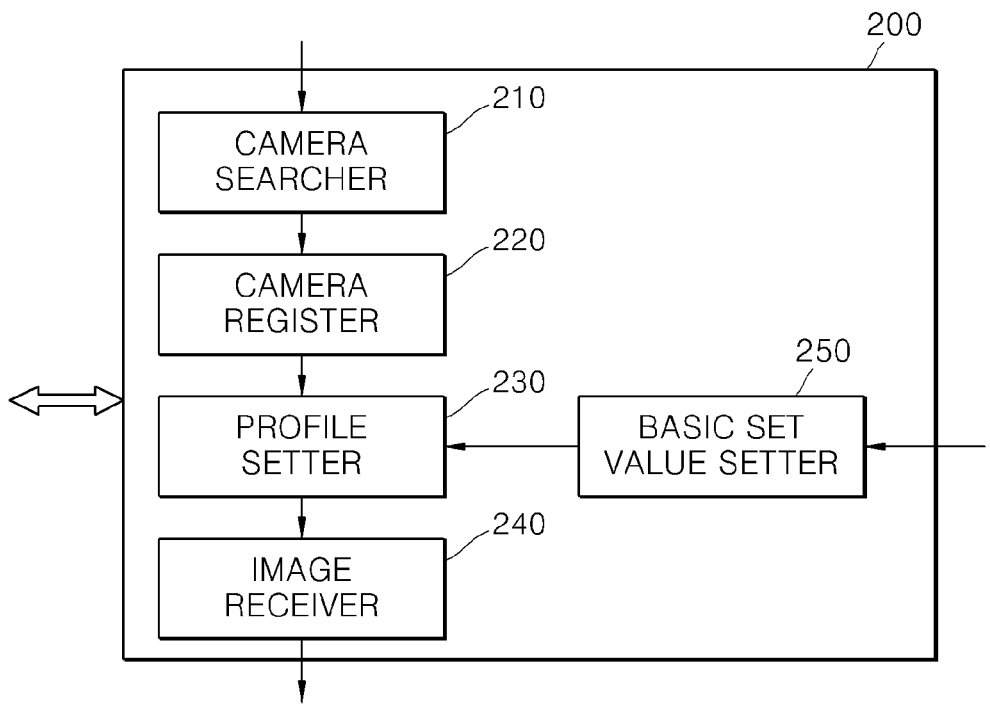
FIG. 2 is a block diagram of an apparatus for receiving an image provided in a server, according to an exemplary embodiment.

FIG. 2 is a block diagram of an apparatus for receiving an image, according to an exemplary embodiment. This apparatus for receiving an image may be provided in the server 20 of FIG. 1.

Referring to FIG. 2, the apparatus 200 for receiving an image, according to an exemplary embodiment, may include a camera searcher 210, a camera register 220, a profile setter 230, and an image receiver 240. The apparatus 200 for receiving an image, according to the exemplary embodiment, may further include a basic set value setter 250. Though not shown, the apparatus 200 for receiving an image may further include a memory, which stores data. In addition, the apparatus 200 for receiving an image may communicate with a storage device provided externally.

In the apparatus 200 for receiving an image shown in FIG. 2, only those elements related to the present embodiment are shown in order to prevent features of the present embodiment from becoming unclear. Accordingly, general-purpose elements, other than those elements shown in FIG. 2, may further be included, as understood by a person skilled in the art.

The apparatus 200 for receiving an image, according to the present embodiment, may correspond to at least one or more processors or may include at least one or more processors. Accordingly, the apparatus 200 may operate by being included in another hardware device, such as a microprocessor or a general-purpose computer system.

The camera searcher 210 searches for a camera 10 connected to the apparatus 200 for receiving an image. The camera searcher 210 may search for the camera 10 from among a plurality of cameras connected to a network. The camera searcher 210 outputs information about the identified camera 10 to the camera register 220.

The camera register 220 registers the camera 10 found by the camera searcher 210. For example, the camera register 220 generates registration information about the camera 10, and stores the registration information. For this, the camera register 220 may refer to information about the camera obtained from the camera 10. For example, the camera register 220 may generate registration information about the camera 10 based on header information transmitted from the camera 10 and/or unique identification information about the camera 10. The registration information may include, for example, a name (ID) of the camera 10, a network address, and performance information, but is not limited to these. The performance information may include a resolution of an image which can be transmitted from the camera 10, and a codec, a frame rate and a bit rate of the camera 10. The codec may also include an audio codec of the camera 10.

The profile setter 230 sets a profile of the camera 10 by referring to the performance information about the camera 10. The profile setter 230 may store a set profile. The profile setter 230 may transmit a set profile to the camera 10. Here, the profile is a kind of agreement on data transmission between the camera 10 and the apparatus 200 for receiving an image, and may indicate specifications of an image which is transmitted to the apparatus 200 for receiving an image.

The profile may include at least one set value. For example, the profile may include set values such as a resolution of an image which is transmitted from the camera 10, and a codec, a frame rate, and a bit rate with respect to the image.

The apparatus 200 for receiving an image may have a basic profile, which is preset. The basic profile may include at least one set value, which is preset. For example, the basic profile may include four (4) basic set values, and may be set as, for example, "MJPEG, 640×480, 5 fps, 2 Mbps", which means that an image of MJPEG codec, a resolution of 640×480, a frame rate of 5 fps, and a bit rate of 2 Mbps is basically received.

According to an exemplary embodiment, the apparatus 200 for receiving an image may have a plurality of basic profiles. According to an exemplary embodiment, the apparatus 200 for receiving an image may include basic profiles corresponding to respective uses, such as a basic profile for recording, a basic profile for network transmission, and a basic profile for live broadcast. The profile setter 230 may set a profile of the camera 10 by referring to a basic profile appropriate to a use. Any one of a plurality of uses may be set as a default use.

According to another exemplary embodiment, the apparatus 200 for receiving an image may include a plurality of basic profiles corresponding to respective time points when a camera is connected. The profile setter 230 may set a profile of the camera 10 by referring to any one basic profile corresponding to a time point when the camera 10 is connected. The time point may be classified according to day of a week, date, and time.

The profile setter 230 determines whether or not an image of this basic profile can be received from the camera 10, and according to the determination result, the profile setter 230 generates a profile of the camera 10. This will now be explained in detail with reference to FIG. 3.

Figure 3:
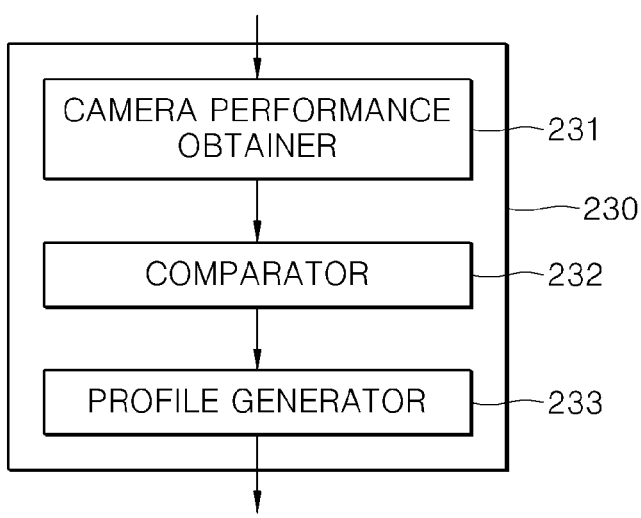
FIG. 3 is a block diagram of a profile setter of FIG. 2, according to an exemplary embodiment.

FIG. 3 is a block diagram of the profile setter 230 of FIG. 2.

According to an exemplary embodiment, the profile setter 230 may set a profile of the camera 10 by comparing the performance information about the camera 10 which is obtained from the camera 10, with a basic profile of the apparatus 200 for receiving an image, which is preset and stored.

Referring to FIG. 3, the profile setter 230 according to an exemplary embodiment includes a camera performance obtainer 231, a comparator 232, and a profile generator 233.

The camera performance obtainer 231 obtains a range of set values which can be set in the camera 10. Here, the range of set values may be a range of continuous numbers having an upper limit and a lower limit, or may include one or more discontinuous predetermined set values.

The comparator 232 compares a basic set value included in the basic profile of the apparatus 200 for receiving an image with the range of set values of the camera 10.

The profile generator 233 generates a profile of the camera 10 according to the comparison result of the comparator 232.

For example, if the basic set value is included in the range of set values of the camera 10 according to the comparison result of the comparator 232, the profile generator 233 may generate a profile of the camera 10 according to the basic set value. In an example of a frame rate, if the basic set value of a frame rate of the apparatus 200 for receiving an image is 30 frame per second (fps) and the range of set values of a frame rate of the camera 10 is 5 fps to 60 fps, a profile of the camera 10 may be generated to include the frame rate set value of 30 fps.

When the basic set value is not included in the range of set values of the camera 10 according to the comparison result of the comparator 232, this case can be broken down into the following three cases:

First, if the basic set value is lower than a lower limit of the range of set values of the camera 10, the profile generator 233 may generate a profile of the camera 10 according to the lower limit of the set values of the camera 10. In an example of a bit rate, if the basic set value of a bit rate of the apparatus 200 for receiving an image is 128 kbps and the range of set values of a bit rate of the camera 10 is 320 kilobits per second (Kbps) to 24 megabits per second (Mbps), a profile of the camera 10 may be generated to include a set value of a bit rate of 320 kbps.

Secondly, if the basic set value is higher than an upper limit of the range of set values of the camera 10, the profile generator 233 may generate a profile of the camera 10 according to the upper limit of the set values of the camera 10. In an example of a frame rate, if the basic set value of the apparatus 200 for receiving an image is 60 fps and the range of set values of a frame rate of the camera 10 is 5 fps to 30 fps, a profile of the camera 10 may be generated to include a set value of a frame rate of 30 fps.

The third case is that the range of set values of the camera 10 includes one or more discontinuous predetermined set values and the basic set value is not included in the range. In this case, a profile of the camera 10 may be generated in the range of set values of the camera 10. In an example of a resolution, if the range of set values of a resolution of the camera 10 includes VGA (640×480), XGA (1024×768), and UXGA (1600×1200) and the basic set value of a resolution of the apparatus 200 for receiving an image is HD720 (1280×720), the profile generator 233 may generate a profile of the camera 10 in the range of set values of the camera 10. In the present embodiment, the profile generator 233 may generate a profile of the camera 10 to include any one of a set value of a resolution among VGA (640×480), XGA (1024×768), and UXGA (1600×1200). For example, a profile of the camera 10 may be generated to include a set value of a resolution of XGA (1024×768), which is most similar to the basic set value. However, the present embodiment is not limited to this.

Referring again to FIG. 2, the image receiver 240 receives an image from the camera 10 based on the profile set by the profile setter 230.

The basic set value setter 250 sets a basic set value of the apparatus 200 for receiving an image. The basic set value may be set based on data input by a user. The user may directly input a plurality of basic set values included in a basic profile.

According to an exemplary embodiment, each of the basic set values included in a basic profile may include priority information. The priority information may be expressed to indicate a priority class such as "top priority", "priority", or "normal", but the present embodiment is not limited to this. The user may input priority information about a basic set value, and the basic set value setter 250 may set a basic set value based on the input priority information.

An example of a case where a basic profile including basic set values of a resolution and a frame rate is preset in the apparatus 200 for receiving an image will now be explained. For example, if the basic profile is preset as "VGA (640×480), 30 fps" and the user inputs upwardly adjusted priority information about a resolution, the basic set value setter 250 may upwardly adjust the basic set value of a resolution in the basic profile, and instead, downwardly adjust the basic set value of another item. For example, the basic set value setter 250 may reset the basic profile of the apparatus 200 for receiving an image to "XGA (1024×768), 5 fps". The specific numbers are just examples for explaining the present embodiment and embodiments are not limited by these.

According to another exemplary embodiment, the basic set value setter 250 may set a basic set value by considering the number and uses of cameras connected to the apparatus 200 for receiving an image. For example, if the number of cameras connected to the apparatus 200 for receiving an image exceeds a preset upper limit, the basic set value setter 250 may downwardly adjust the basic set value of the apparatus 200 for receiving an image. If the basic set value is downwardly adjusted, the profile setter 230 may reset the profile of each of the cameras connected to the apparatus 200 for receiving an image by referring to the reset basic set value.

According to still another exemplary embodiment, the basic set value setter 250 may set a basic set value by considering the storage capacity of the apparatus 200 for receiving an image. For example, the basic set value setter 250 detects a change in the storage capacity of the apparatus 200 for receiving an image and may reset a basic set value corresponding to the changed storage capacity. If the basic set value is reset, the profile setter 230 may reset the profile of each of the cameras connected to the apparatus 200 for receiving an image by referring to the reset basic set value.

According to still another embodiment, the basic set value setter 250 may set a basic set value by considering the specifications of the display device 40 connected to the server 20. For example, the basic set value setter 250 may set a basic set value to include a set value of a codec which can be decoded by the display device 40 connected to the server 20. If the display device 40 connected to the server 20 is replaced or a new display device 40 is recognized, the basic set value setter 250 detects this and may reset the basic set value by considering a codec which can be decoded by the new display device 40 or the newly recognized display device 40. The profile setter 230 may reset the profile of each of the cameras connected to the apparatus 200 for receiving an image by referring to the reset basic set value.

When a profile of a camera is reset by various reasons including the reasons described above, the profile setter 230 may generate a profile change log and store the log in a memory.

According to an exemplary embodiment, the profile setter 230 may detect that the profile of the camera 10 is changed not by the apparatus 200 for receiving an image but by an external factor, and in this case, the profile setter 230 may reset the profile of the camera 10.

According to an exemplary embodiment, when the camera 10 connected to the apparatus 200 for receiving an image performs dual streaming, the profile setter 230 may set 2 profiles corresponding to the dual streaming of the camera 10, respectively.

Figure 4:
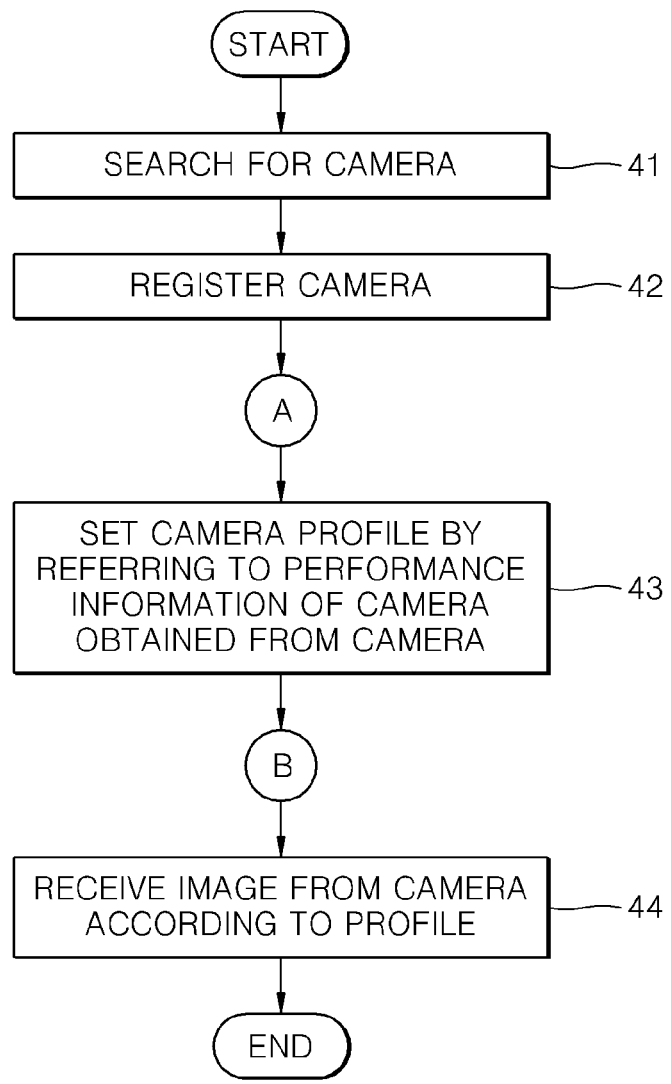
FIG. 4 is a flowchart of a method of setting a camera profile, according to an exemplary embodiment.

FIG. 4 is a flowchart of a method of setting a camera profile, according to an exemplary embodiment.

Referring to FIG. 4, the camera searcher 210 searches for a camera 10 in operation 41.

In operation 42, the camera register 220 registers the camera 10 identified in operation 41.

In operation 43, the profile setter 230 generates a profile of the camera 10 by referring to performance information about the camera 10 that is obtained from the camera 10. The profile includes at least one set value. Each of the set values included in the profile may include priority information. The set value may include at least one of a resolution of an image, a frame rate, a codec, and a bit rate.

In operation 44, the image receiver 240 receives an image from the camera 10 based on the profile set in operation 44.

FIG. 5 is a detailed flowchart of operation 43 of FIG. 4, according to an exemplary embodiment.

Referring to FIG. 5, in operation 431, the camera performance obtainer 231 obtains a range of set values which can be set in a camera.

In operation 432, the comparator 232 compares a basic set value of the apparatus 200 for receiving an image which is preset and stored, with the range of set values of the camera 10. The preset basic set value is included in a preset basic profile, and each of the basic set values included in the basic profile may include priority information. Each of the plurality of basic set values included in the basic profile may be set based on its priority information.

In operation 433, the profile generator 233 generates a profile of the camera 10 according to the comparison result in operation 432. For example, if the basic set value is included in the range of set values of the camera according to the comparison result, the profile is set to include the basic set value. If the basic set value is not included in the range of set values of the camera, the profile of the camera 10 is set in the range of set values of the camera.

For example, if the basic set value is lower than a lower limit of the set values of the camera, the profile is generated to include the lower limit set value. However, if the basic set value is higher than an upper limit of set values of the camera, the profile is generated to include the upper limit set value.

The method of setting a camera profile, described with reference to FIGS. 4 and 5, can be written as computer programs and can be implemented in general-use digital computers that execute the programs using a computer-readable recording medium. Examples of the computer-readable recording medium include magnetic storage media (e.g., read-only memory (ROM), floppy disks, hard disks, etc.), 0optical recording media (e.g., compact disc (CD)-ROMs, digital versatile discs (DVDs, etc.), etc.

The components, elements or units represented by a block as illustrated in FIGS. 2-3 may be embodied as the various numbers of hardware, software and/or T structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like.

While the inventive concept has been particularly shown and described with reference to exemplary embodiments thereof, it will be understood by those skilled in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A method of setting a camera profile by an apparatus, the method comprising:
    registering, in a memory of the apparatus, information about a camera connected to the apparatus via a network;
    setting a profile of the camera based on the information about the camera;
    receiving an image from the camera according to the profile; and
    setting a basic set value;
    wherein the setting the profile of the camera comprises:
        obtaining a range of set values of the camera;
        comparing the basic set value with the range of set values; and
        generating the profile of the camera according to a result of the comparison.

2. The method of claim 1, wherein the setting the profile comprises determining performance of the camera with respect to image processing based on the information about the camera and setting the profile based on the determined performance of the camera.

3. The method of claim 1, wherein the generating the profile comprises:
    if the basic set value is included in the range of set values of the camera, generating the profile to include the basic set value;
    if the basic set value is lower than a lowest set value of the camera, generating the profile to include the lowest set value; and
    if the basic set value is higher than a highest set value, generating the profile to include the highest set value.

4. The method of claim 1, wherein the profile comprises a plurality of set values, and the setting the basic set value comprises setting the basic set values based on priority information about each of the set values.

5. The method of claim 1, wherein the profile comprises at least one of resolution, frame rate, codec, and bit rate with respect to the image transmitted from the camera.

6. The method of claim 1, wherein the setting the basic set value is performed based on at least one of performance of a network device for receiving an image, capacity of a storage device for storing the image received by the network device, and a display device for displaying the image received by the network device; and
    wherein the receiving is performed using the network device.

7. The method of claim 1, wherein the profile of the camera is set further referring to a plurality of set values which are set corresponding to respective uses of at least one image input from the camera.

8. The method of claim 7, wherein the respective uses comprise at least one of recording, network transmission and live broadcast of the at least one image.

9. The method of claim 1, wherein the setting the profile of the camera further comprises referring to a plurality of set values which are set corresponding to respective time points.

10. An apparatus for receiving an image, the apparatus comprising:
    a memory storing computer program code; and
    at least one processor configured to access the memory and operate as instructed by executing the program code, wherein the program code comprises:
        camera register code configured to cause the at least one processor to register information about a camera connected to the apparatus via a network;
        profile setting code configured to cause the at least one processor to set a profile of the camera based on the information obtained from the camera;
        image receiving code configured to cause the at least one processor to receive an image from the camera according to the profile; and
        a basic set value setting code configured to cause the at least one processor to set a basic set value;
    wherein the profile setting code comprises:
        camera performance obtaining code configured to cause the at least one processor to obtain a range of set values of the camera;
        comparison code configured to cause the at least one processor to compare the basic set value with the range of set values; and
        profile generating code configured to cause the at least one processor to generate the profile according to a result of the comparison.

11. The apparatus of claim 10, wherein the profile setting code causes the at least one processor to determine performance of the camera with respect to image processing based on the determined performance and causes the at least one processor to set the profile based on the performance of the camera.

12. The apparatus of claim 10, wherein if the basic set value is included in the range of set values of the camera, the profile generating code causes the at least one processor to generate the profile to include the basic set value;
    if the basic set value is lower than a lowest set value of the camera, the profile generating code causes the at least one processor to generate the profile to include the lowest set value; and
    if the basic set value is higher than a highest set value, the profile generating code causes the at least one processor to generate the profile to include the highest set value.

13. The apparatus of claim 10, wherein the profile comprises a plurality of set values, and the basic set value setting code causes the at least one processor to set the basic set values based on priority information of each of the set values.

14. The apparatus of claim 10, wherein the profile comprises at least one of resolution, frame rate, codec, and bit rate with respect to the image transmitted from the camera.

15. The apparatus of claim 10, wherein the basic set value setting code causes the at least one processor to set the basic set value based on at least one of performance of a network device for receiving an image, capacity of a storage device for storing the image received by the network device, and a display device for displaying the image received by the network device; and wherein the image receiver uses the network device to receive the image.

16. The apparatus of claim 10, wherein the profile setting code causes the at least one processor to set the profile of the camera based on a plurality of set values which are set corresponding to respective uses of at least one image input from the camera.

17. The apparatus of claim 16, wherein the respective uses comprise at least one of recording, network transmission and live broadcast of the at least one image.

18. The apparatus of claim 10, wherein the profile setting code causes the at least one processor to set the profile of the camera based on a plurality of set values which are set corresponding to different time points.

* * * * *